United States Patent Office 3,476,552
Patented Nov. 4, 1969

3,476,552
MERCURY PROCESS
George A. Parks, Stanford, and Robert E. Baker, San Francisco, Calif., assignors to Mountain Copper Company of California, Martinez, Calif., a corporation of California
No Drawing. Filed Sept. 7, 1966, Ser. No. 577,604
Int. Cl. C22b 3/00
U.S. Cl. 75—101                                        7 Claims

ABSTRACT OF THE DISCLOSURE

Mercury is recovered from mercury containing material by contacting the material with a hypochlorite solution maintained at a pH of 4.5 to 9.5 to dissolve the mercury in the hypochlorite solution. The mercury may be recovered from the solution by various means such as by adsorbing the mercury on activated carbon and heating the carbon to volatilize the mercury and regenerate the carbon.

---

This invention relates to a hydrometallurgical process for the extraction and recovery of mercury from mercury bearing materials.

The classic process for recovering mercury from its ore has been a pyrometallurgical technique wherein the ore is merely heated to oxidize the cinnabar and volatilize the mercury or its compounds and the mercury condensed. This process has a number of disadvantages, the principle one being that there is a relatively low recovery of mercury from low grade ores. Further, the process constitutes a health hazard unless adequate precautions are taken and there is also an air pollution problem. Although hydrometallurgical processes have been proposed in the past, they have not been of practical importance, apparently because the heretofore proposed processes use large amounts of expensive solvents and are thus uneconomic.

It is therefore the object of the present invention to provide an improved process for the hydrometallurgical extraction and recovery of mercury.

Another object of this invention is to provide an economical hydrometallurgical process which can be applied to low grade as well as high grade ores. In fact, the process of the invention renders it economical to retreat the waste material which has resulted from the pyrometallurgical extraction of mercury from its ores.

Another object of this invention is to provide a process wherein the pH and concentrations of the various ingredients are closely controlled whereby there is a minimum consumption of solvent.

Another object of this invention is to provide a hydrometallurgical extraction process wherein the material being extracted is pre-washed when necessary to remove deleterious water soluble materials therefrom and thus reduce solvent consumption.

Still another object of this invention is to provide a hydrometallurgical mercury extraction process which is not limited to the extraction of mercury from high grade cinnabar ores but which can be applied to any material containing mercury whether the mercury be in the form of the oxide, chloride, sulfide or as free mercury.

A further object of the invention is to provide an improved recovery process for extracting dissolved mercury from a solution utilizing adsorption on activated carbon.

Other objects of the invention will be apparent from the balance of the specification.

In accordance with the present invention it has been found that mercury can be extracted not only from cinnabar but from any ore or product containing mercury as metal, as a sulfide or as any other mercury compound such as the chloride or oxide. The mercury is removed by employing, as solvent, a hypochlorite solution, provided that the pH is kept within the range of 4.5 to 9.5. Preferably, the solution is maintained at a pH of from 5.5 to 7.5 and optimum results are achieved at a pH of about 6.2. Suitable hypochlorite solutions can be made by reaction of $Cl_2$ with NaOH or $Ca(OH)_2$ or the like, prior to or during leaching, by direct use of solid or liquid hypochlorites, or electrolysis of chlorides or like methods as is will known to those skilled in the art. It is preferred to operate with a stoichiometric amount of the hypochlorite to dissolve the mercury which is about 1½ parts by weight of hypochlorite per part by weight of mercury if the mercury is present as mercuric sulfide or about ⅜ of a part of hypochlorite per part of mercury if the mercury is present as metal. In addition, some reaction with non-mercury bearing components of the ore should be expected so that increases must be made if reagent consuming materials such as pyrite, marcasite, elemental sulfur and ferrous sulphates are present. However, as will later appear in the specification, by suitable design of the process flow sheet and careful control of the pH and reagent concentration, only a small amount of solvent need be lost through the reaction with non-mercury components. Inclusion of a water-wash prior to hypochlorite leaching is an example of suitable design. Some of the reagent consuming materials such as ferrous sulphate are water soluble, so that the efficiency of extraction can be greatly increased by first water-washing the ore prior to the mercury dissolution step. The beneficial effect of water-washing will be illustrated in some of the examples which follow.

Mercury can be recovered from the hypochlorite leach solutions by any of several means including:

(a) Precipitation as the oxide using sodium hydroxide or sodium hypochlorite to raise the pH to the range 10 to 12.

(b) Precipitation as the sulfide using sodium or calcium sulfide or hydrosulfide or hydrogen sulfide gas.

(c) Electrolysis of the solution using metallic, graphite, or mercury cathodes.

(d) Adsorption on to ion exchange resins.

(e) Cementation or replacement of mercury from solution using metallic copper, zinc, aluminum or iron to yield metallic mercury.

The present invention also includes a highly efficient method of recovering the mercury from the hypochlorite solution. Previously it was necessary to thicken, filter and purify the mercury bearing solution so that the mercury could ultimately be recovered as reasonably pure mercury.

By the process of an embodiment of the present invention, mercury can be precipitated or adsorbed on activated carbon and then recovered from the activated carbon by any one of several methods. The advantage to be gained by the use of the present invention lies in the fact that filtration and clarification of solutions is eliminated. The mercury in solution is selectively adsorbed by the activated carbon, while still in contact with the mixture of other constituents including solids from which it is desired to separate it.

The activated carbon, upon which the mercury is adsorbed is then separated from the mixture either by screening the carbon away from the mixture, by flotation of the carbon, or any other method desired. The mercury enriched carbon is saved for removal of the mercury while the barren pulp or mixture will contain no economic mercury value and can be discarded.

The mercury may be removed from its carbon adsorption by heating the pregnant or mercury enriched carbon in a retort, in the absence of oxygen, at a temperature sufficiently high to volatilize the mercury. The mercury is then condensed to its liquid state. The carbon is then suitable for re-use to adsorb more mercury from a similar sequence of operations.

Although activated carbon is a relatively costly commodity, the ability to reactifate it by the mere process of removing the mercury renders the net cost low enough to make the process economically feasible. Generally it is preferred to employ about one ton of carbon for each 200 pounds of mercury although a smaller or larger quantity may be used.

Examples 1 through 6 illustrate preferred methods of dissolving the mercury in hypochlorite solutions while Examples 7 through 11 illustrate the recovery of the mercury through the use of active carbon.

EXAMPLES 1 AND 2

Two 100 gram samples of oxidized mercury sulfide ores from Sulfur Bank, California were crushed finer than 8 mesh (Tyler Series) and mixed with 200 ml. of 5% NaOCl solution. One sample had a mercury content of 0.7 lb. per ton and the other 2.5 lbs. per ton. After mixing, the pH was adjusted to pH 8–9 with hydrochloric acid and NaOH as necessary. The samples were agitated by rolling in pint polyethylene jars. At intervals of ½, 1, 2, 4, 8 and 16 hours samples were taken, pH measured and adjusted to lie within the range 8–9. After 16 hours, the pH was again measured, the samples filtered, washed on a filter with water adjusted to pH 8.5 with NaOH, and the solid residue assayed for mercury by X-ray spectrography. Results of the two runs were:

| Test Number | Lbs. Hg/ton in feed | Max. pH | Min. pH | Final pH | Percent mercury extraction |
|---|---|---|---|---|---|
| Example 1 | 0.7 | 8.8 | 7.6 | 7.6 | 100 |
| Example 2 | 2.5 | 8.7 | 7.6 | 7.6 | 100 |

EXAMPLE 3

A mercury ore assaying 1.28 lbs. per ton of mercury was ground to minus 35 mesh. 150 grams of this ore was placed in a polyethylene bottle and 1.35 grams of sodium hypochlorite was added as a water solution together with sufficient water to yield a suspension containing 33.3% solids by weight. The bottle was agitated for 7 hours and the pH was then adjusted to 6.2 and the bottle was agitated for an additional half-hour. The material was then filtered and the filter was first washed with water and then with a mixture of alcohol and acetone. The residue was then dried at 100° C. and analyzed for mercury and the amount of mercury extracted was found by the difference between the amount of starting mercury and the amount left on the filter. The extraction was 74.22%.

EXAMPLE 4

The procedure of Example 3 was followed except that prior to adding the sodium hypochlorite, clean water was added to give a suspension containing 25% solids. This was stirred for one hour, allowed to settle and decanted to 45% solids. Additional water was then added to the original level and the material agitated for one hour. Again the material was allowed to settle and decanted to 45% solids. At this point, the exact procedure of Example 3 was followed. Here it was found that the extraction was 95.31%.

EXAMPLE 5

In this example, the ore had a mercury content of 0.56 lb. per ton and 0.90 gram of sodium hypochlorite was used for the extraction. The procedure was that of Example 3. Here the extraction was only 25%.

EXAMPLE 6

The process of Example 5 was repeated except the prewashing step of Example 4 preceded the extraction with sodium hypochlorite. Here the extraction was increased to 96.43%.

EXAMPLE 7

To an ore pulp containing 3.69 grams of mercury in solution prepared in accordance with Example 1, 100 grams of activated carbon was added. The pH was 7.6.

After stirring for 2 hours a sample of the filtered solution showed a mercury assay of nil.

EXAMPLE 8

To an ore sample containing 3.87 grams of mercury in hypochlorite solution at a pH of 7.2, 75 grams of activated carbon was added.

After stirring for 1 hour the filtered solution contained no soluble mercury.

EXAMPLE 9

A filtered solution of mercury chloride containing 3.68 grams of mercury was treated with activated carbon. After 24 hours 90% of the mercury was adsorbed onto the carbon. An additional 10 grams of carbon was added to the suspension and after stirring for an additional hour the solution was barren of mercury. The pregnant carbon was then placed in a retort and heated to a temperature of about 1200° F. for 5 hours and the mercury recovered by condensation.

EXAMPLE 10

The pregnant carbon from Examples 7 and 8 was placed in a container with an opening on one end. In this opening a pipe was placed which connected to a condensing system. The container was placed in a muffle furnace and the temperature raised to 1040° F. and maintained for 6 hours. The whole was then cooled and the mercury removed from the condenser. The carbon which was barren of mercury was used in a subsequent test as an adsorbent for mercury.

This process was repeated five times with no apparent loss in the power of the carbon to adsorb mercury. The solution after each test was substantially barren of mercury, it having been recovered on the carbon from which it was subsequently removed by retorting.

EXAMPLE 11

A sample of pulp containing 5.46 grams of mercury in hypochlorite solution of a pH of 6.3 was stirred with 25 grams of activated carbon and after 1 hour 36.9% of the mercury was adsorbed by the carbon. An additional 25 grams of carbon was added at this time and the stirring continued for another hour. The filtered solution contained no detectable mercury.

We claim:

1. A process for recovering mercury from a mercury containing material comprising contacting said material with a hypochlorite in water solution maintained at a pH of from 4.5 to 9.5 whereby the mercury is dissolved in said hypochlorite solution, treating the thus prepared mercury solution with activated carbon to adsorb the mercury, separating the carbon therefrom, heating the carbon to volatilize the mercury therefrom and to regenerate the carbon, and condensing and recovering the mercury.

2. The process of claim 1 wherein the mercury containing material is washed with water prior to contact with the hypochlorite solution.

3. The process of claim 1 wherein the hypochlorite solution is maintained at a pH of from 5.5 to 7.5.

4. The process of claim 1 wherein the pH is maintained at about 6.2.

5. The process of claim 1 wherein the mercury is present as the sulfide and at least 1½ parts by weight of hypochlorite is employed per part of mercury.

6. The process of claim 1 wherein the mercury is present as metal and wherein at least ⅜ part by weight of hypochlorite is employed per part of mercury.

7. The process of claim 1 wherein the amount of carbon employed is about 10 parts by weight carbon for each part of mercury in the solution.

References Cited

UNITED STATES PATENTS

| | | | |
|---|---|---|---|
| 1,637,481 | 8/1927 | Glaeser | 75—121 |
| 2,545,239 | 3/1951 | McQuiston et al. | 210—40 |
| 3,083,079 | 3/1963 | Calkins et al. | 210—24 |
| 3,193,987 | 7/1965 | Manes et al. | 55—72 |
| 3,257,776 | 6/1966 | Park et al. | 55—72 |

L. DEWAYNE RUTLEDGE, Primary Examiner

T. R. FRYE, Assistant Examiner

U.S. Cl. X.R.

75—81, 97, 121